Feb. 23, 1960
C. B. STEGNER
2,926,306
ELECTRICAL INSTRUMENT POINTER STOPS
Filed Sept. 20, 1957
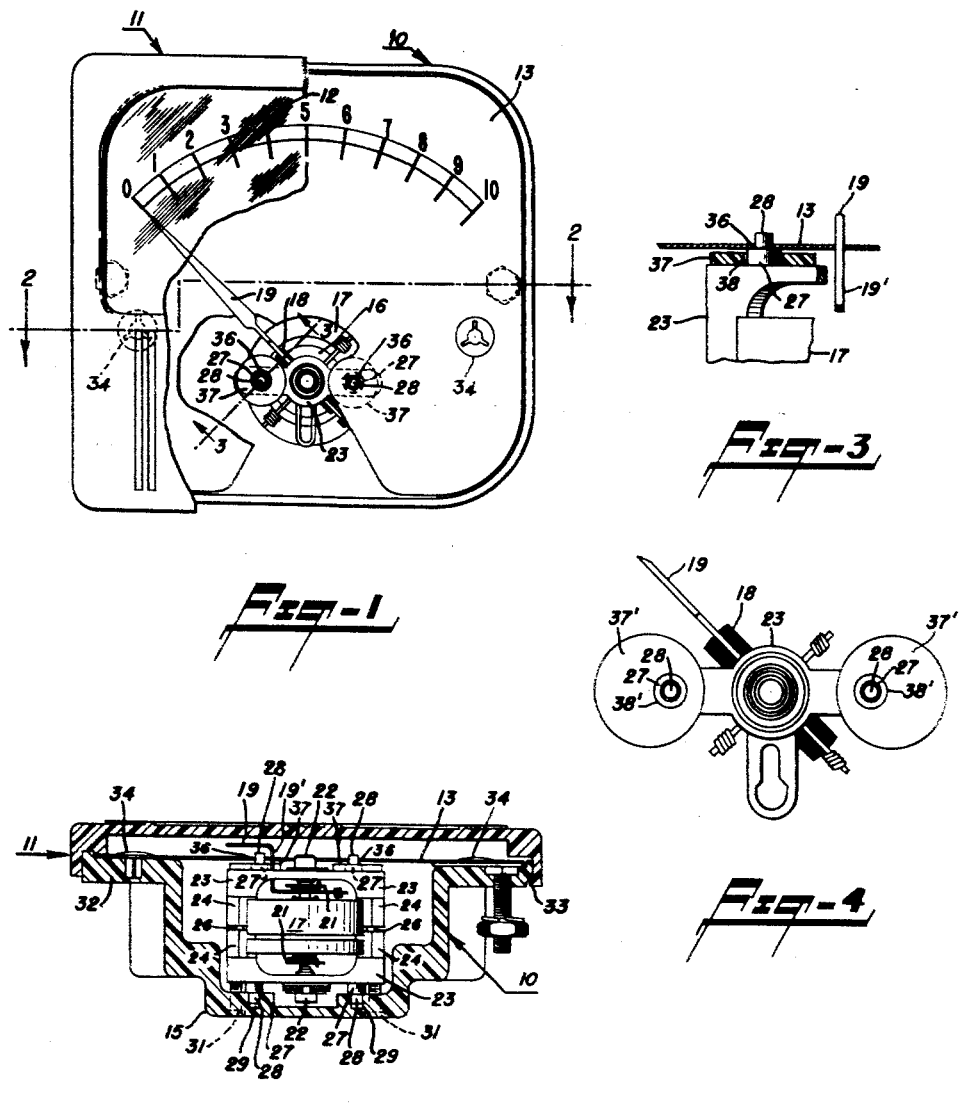
CHARLES B. STEGNER
INVENTOR.
BY
Rudolph J. Junick
ATTORNEY United States Patent Office 2,926,306
Patented Feb. 23, 1960

2,926,306

ELECTRICAL INSTRUMENT POINTER STOPS

Charles B. Stegner, Verona, N.J., assignor, by mesne assignments, to Daystrom, Incorporated, Murray Hill, N.J., a corporation of New Jersey Application September 20, 1957, Serial No. 685,280

10 Claims. (Cl. 324—154)

This invention relates to electrical instruments and more particularly to a novel pointer stop arrangement for limiting the movement of the instrument pointer.

Instruments of the class contemplated by this invention generally comprise a case within which is mounted the instrument mechanism and a transparent cover through which the scale of the instrument is visible. In accordance with present practice, the scale plate, which carries a suitably graduated scale, is generally secured to the instrument mechanism, particularly the instrument bridge posts. Often, pointer stops are also secured to the bridge or bridge posts, which stops comprise elongated arm members extending therefrom. The pointer stops of such instruments must be properly angularly positioned during the assembly of the instrument in order to set the pointer limits. The cost of producing such parts, assembling, and adjusting them, adds materially to the overall cost of the instrument. The pointer stops of my invention comprise simple, generally cylindrical-shaped members of insulating material which are positioned on members projecting from the instrument bridge. If cylindrical-shaped pointer stops having an axial bore are used, they are simply loosely positioned on the projections; no further adjustment thereof being necessary. If, on the other hand, adjustment of the pointer limits is deemed desirable, eccentric pointer stops may be used which are press fitted over the bridge projections. The pointer limits are then established by properly angularly positioning the stops on the projections.

An object of this invention is the provision of a simplified instrument pointer stop arrangement requiring a minimum number of parts.

An object of this invention is the provision of a simple instrument pointer stop arrangement in which a minimum number of parts are used and no adjustment thereof is necessary whereby the material and labor expense involved in the manufacture of the instrument is greatly reduced over contemporary instruments of similar quality.

An object of this invention is the provision of an instrument pointer stop mechanism comprising a pair of cylindrical-shaped insulating members loosely mounted upon projections extending from the instrument bridge.

An object of this invention is the provision of an instrument pointer stop mechanism comprising a pair of eccentric insulating members press fitted on projections extending from the instrument bridge, the pointer limits being adjustable by properly rotatably positioning the said stops on the projections.

An object of this invention is the provision of an electrical instrument comprising a cup-shaped case, an instrument mechanism mounted in and supported by the case, the said instrument mechanism including a bridge member, a pointer actuated by the said mechanism, post members extending upwardly of the said bridge member, pointer stops comprising generally cylindrical-shaped members mounted on the said posts, and a scale plate overlying the said pointer stops thereby limiting upward axial movement of the stops.

These and other objects and advantages will become apparent from the following description when taken with the accompanying drawings. It will be understood that the drawings are for purposes of illustration and are not to be construed as defining the scope or limits of the invention, reference being had for the latter purpose to the appended claims.

In the drawings wherein like reference characters denote like parts in the several views:

Figure 1 is a front view of the instrument with a portion of the cover and scale plate broken away for clarity;

Figure 2 is a vertical sectional view taken on line 2—2 of Figure 1;

Figure 3 is an enlarged fragmentary sectional view of my novel pointer stop taken on line 3—3 of Figure 1; and Figure 4 is a fragmentary front view of an instrument showing the use of a modified form of pointer stop employed therein.

Reference is first made to Figures 1 and 2 wherein an instrument casing or housing comprising a cup-shaped case 10, made of suitable plastic, and a cover 11 of transparent material is shown. In practice, it is preferable to coat the outer surface of the cover with an opaque paint, leaving only an area 12 which serves as a window through which is visible the entire operating range of the calibrated scale carried by the scale plate 13. The case 10 includes a recessed portion 15 for accommodating the instrument mechanism.

The instrument mechanism illustrated in the drawings comprises a substantially cylindrical permanent magnet 16 (seen in Figure 1) spaced from a generally cylindrical soft-iron yoke 17. A wire-wound movable coil 18, carrying a pointer 19, is pivoted for rotation in the magnetic flux gap established between the magnet core and the yoke. The movable coil rotates through an angle which varies with the magnitude of the current flowing in the coil, the current being conducted to the coil through the spiral hair springs 21, as is well known in the art. As is common practice, the movable coil is carried by axially aligned pivots 22 carried by bridge members 23. The bridge members, disposed on opposite sides of the mechanism, may comprise generally U-shaped members having parallel extending leg portions 24 which are positioned adjacent the yoke 17 and terminate a spaced distance apart. Tapered pins 26 between the leg portions 24 secure the bridge members 23 together, and to the yoke 17.

The bridge members 23, 23, which are shown to be of identical construction, are each provided with projections 27 of circular shape, which, in turn, are provided with reduced diameter pins, or extensions, 28. In the illustrated arrangement, the lower extension members 28 extend into corresponding pockets or holes 29 formed in the bottom of the case, thereby properly positioning the instrument mechanism within the case. Any suitable means may be used to secure the instrument in the case. For example, screws 31 passing through holes provided in the bottom of the case and into appropriate threaded holes in the lower bridge member 23 may be used.

The case 10 includes an integral, outwardly-extending flange 32 to which the cover 11 is secured by any suitable means. In the drawings, the cover is shown provided with an inturned lip 33 which engages the underside of the flange. It will be understood that any suitable means, such as screw fastening devices, may be used to secure the cover to the case flange.

The scale plate 13 is attached to the flange 32 by expansible, removable, rivet devices 34 which extend through holes in the scale plate and into suitable holes formed in the flange. Further, when the cover is secured to the case, the scale plate is clamped therebetween. The graduated scale on the scale plate is properly and positively oriented with respect to the rotational axis of the instrument movable coil by the upper extensions 28 which pass through close fitting holes 36 formed in the scale plate, which holes are precisely positioned, or located, as by a punching operation or by the use of a suitable drill jig. It will be apparent, then, that the arc of the graduated scale, carried by the scale plate, may be positioned with its center coinciding exactly with the pivot axis of the movable coil.

The circular-shaped projections 27 on the top of the upper bridge member 23 provide mounting supports in my novel pointer stop arrangement. In one embodiment of my invention, the pointer stops, which are designated 37, are of a generally cylindrical shape, having an axial aperture or bore, designated 38, extending therethrough and perpendicular to the upper and lower faces thereof. Reference is now made to Figure 3 of the drawings wherein an enlarged fragmentary sectional view of a pointer stop is shown. The bore 38 of the cylindrical-shaped pointer stop is preferably made slightly larger than the diameter of the circular projection 27 which it directly supportedly receives, whereby the pointer stop is free to rotate thereon. Further, the thickness of the pointer stop is preferably somewhat less than the height of the projection whereby clamping engagement of the stop between the scale plate and bridge member is prevented. Thus, the pointer stops 37, which are made of a plastic, ceramic, or other suitable material, are free to rotate with vibration of the instrument and/or upon contact of the pointer with the stops, whereby the possibility of the pointer sticking, or adhering, to the stops upon contact therewith is greatly reduced.

As seen in the drawings, the pointer stops 37 are of a diameter large enough whereby they extend beyond the sides of the upper bridge member 23 and are spaced a short distance from the pointer when the pointer is positioned at the lower and upper ends of the instrument scale. Contact of the pointer with the pointer stops is made only when the pointer falls a relatively short distance below the lower end of the scale or moves a relatively short distance past the upper end of the scale a small amount. When this occurs, the generally vertically oriented section of the pointer designated 19', contacts the pointer stops and protectingly limits further rotation of the pointer.

Reference is now made to Figure 4 of the drawings wherein a modified form, or embodiment, of my invention is shown wherein the generally cylindrical stops are adjustable to establish variable pointer limits. As seen in Figure 4, eccentric pointer stops 37' are utilized; the bore 38' thereof being parallel to but displaced from the axis of but within the peripheries or outlines of the rotund stops. Further, the bore 38' is made slightly smaller than the bore 38 in the pointer stops shown in Figures 1–3 whereby the stops 37' are press fitted on the extensions 27. The fit between the bore 38' and extension is such that rotary movement of the stops under normal instrument usage is prevented. Thus, it will be seen, that the pointer limits depend upon the rotary position of the stops; adjustment of the pointer stops being made by rotatably positioning, or rotating the same on the extensions 27 to a desired adjusted position. Although eccentric stops are shown in Figure 4, it will be apparent that the stops may be provided with other contoured edges of suitable shape, if desired.

Having now described my invention in detail in accordance with the requirements of the patent statutes, various other changes and modifications will suggest themselves to those skilled in this art. For example, the extensions, or pins 27 which are shown formed integrally with the bridge members 23 may comprise threaded members, or posts, which engage suitably tapped holes in the bridge members. Further, the projections 28 which are shown integrally formed on the extensions 27 and which are used to locate the scale plate, are not necessary and may, therefore, be eliminated if other suitable means are used to properly orient the scale plate; which means include, for example, closely fitting the periphery of the scale plate within a ledge formed on the flange 32 of the casing. It is intended that these and other such changes and modifications may be made without departing from the scope and spirit of the invention as recited in the following claims.

I claim:

1. In an electrical instrument with actuating mechanism comprising a rotatable member, a pointer carried thereby and movable over a scale plate, upper and lower bridge members disposed on opposite sides of said rotatable member and serving to pivotally support it for movement about an axis, posts extending parallel to said axis from one of said bridge members, and generally cylindrical pointer stops disposed above the upper bridge member, provided with upper and lower faces and formed with apertures perpendicular to said faces and directly supportedly receiving said posts, and sufficiently large in diameter whereby they extend beyond the upper bridge member to protectingly limit movement of said pointer.

2. The invention as recited in claim 1 wherein the said pointer stops are free to rotate upon the said posts whereby the contact point between the pointer and stops change with rotation of the said stops.

3. The invention as recited in claim 1 including a scale plate, the said pointer stops being positioned between the said bridge member and scale plate.

4. The invention as recited in claim 1 wherein the said posts are integrally formed on the said bridge member.

5. The invention as recited in claim 1, wherein the posts are received in the pointer stops with sufficient clearance so that said stops may be rotated during normal use of the instrument.

6. In an electrical instrumnet with actuating mechanism comprising a rotatable member, a pointer carried thereby, bridge members disposed on opposite sides of said rotatable member and serving to pivotally support it for movement about an axis, pointer stops comprising members generally circular at their outer peripheries and having apertures eccentric to but within said outer peripheries, posts extending parallel to said axis, from one of said bridge members and frictionally received in said apertures, the pointer limits being set by rotating said generally circular members on the posts to desired adjusted positions.

7. In an electrical instrument with actuating mechanism comprising a rotatable member, a pointer carried thereby, bridge members disposed on opposite sides of said rotatable member and serving to pivotally support it for movement about an axis, posts extending from one of said bridge members, parallel to said axis, pointer stops comprising rotund members mounted eccentrically upon said posts extending therethrough within their outlines, and means maintaining the said stops on said posts at any desired angular position, whereby the pointer limits may be adjustably set by rotatably positioning the rotund members on the posts.

8. In an electrical instrument with actuating mechanism comprising a rotatable member, a pointer carried thereby, bridge members disposed on opposite sides of said rotatable member and serving to pivotally support it for movement about an axis, posts extending from one of said bridge members parallel to said axis, an arrangement comprising generally cylindrical pointer stops with apertures therethrough parallel to but offset from their axes and frictionally receiving said posts, whereby the pointer limits are adjustably set by rotatably positioning said pointer stops on the posts.

9. In an electrical instrument with actuating mechanism comprising a rotatable member, a pointer carried thereby, bridge members disposed on opposite sides of said rotatable member and serving to pivotally support it for movement about an axis, posts extending from one of said bridge members parallel to said axis, and generally cylindrical pointer stops frictionally receiving said posts in apertures therethrough eccentric to the axes of said stops, whereby the pointer limits may be adjustably set by rotatably positioning the pointer stops on the said posts.

10. The invention as recited in claim 9 wherein the said pointer stops are positioned between the said scale plate and bridge member.

References Cited in the file of this patent

UNITED STATES PATENTS

| | | |
|---|---|---|
| 1,743,354 | Johnson | Jan. 14, 1930 |
| 2,229,399 | Truax | Jan. 21, 1941 |
| 2,380,609 | Pearce | July 31, 1945 |
| 2,422,714 | Bigelow | June 24, 1947 |
| 2,529,557 | Keroes | Nov. 14, 1950 |
| 2,704,349 | Sheehan | Mar. 15, 1955 |
| 2,793,607 | Brown | May 28, 1957 |